(No Model.)
E. L. BURGOIN.
OVERFLOW, WASTE, AND TRAP FOR BASINS, BATHS, &c.
No. 497,465. Patented May 16, 1893.
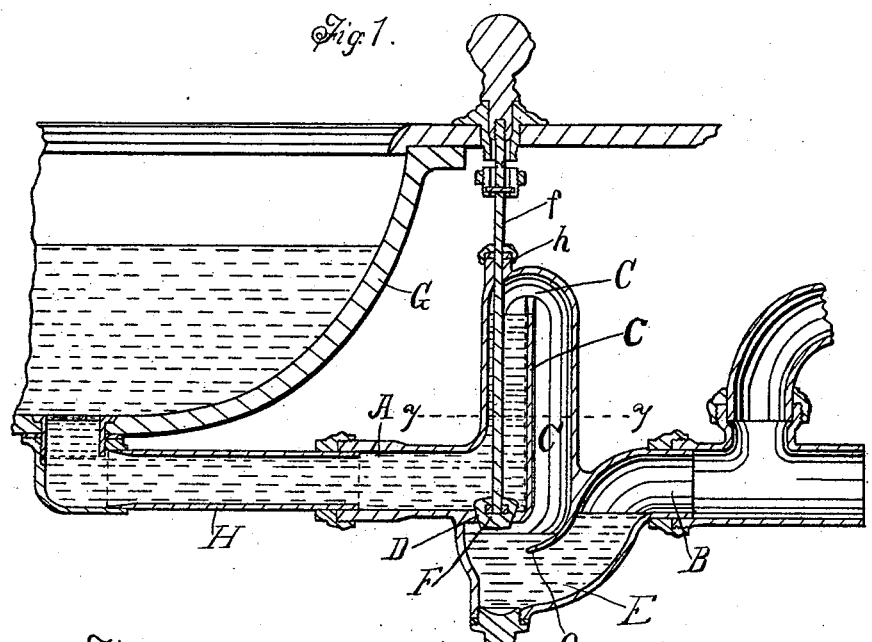
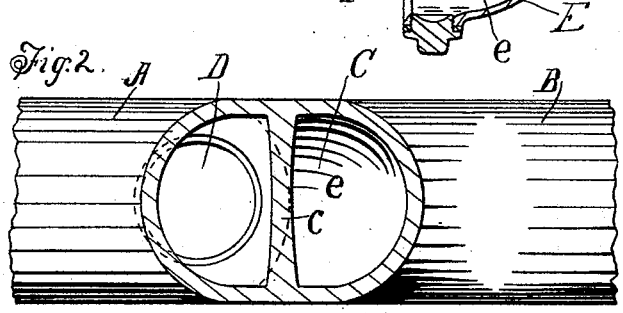
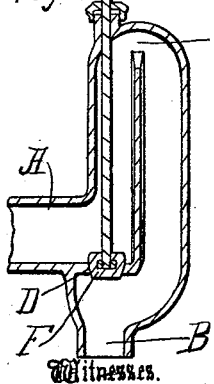
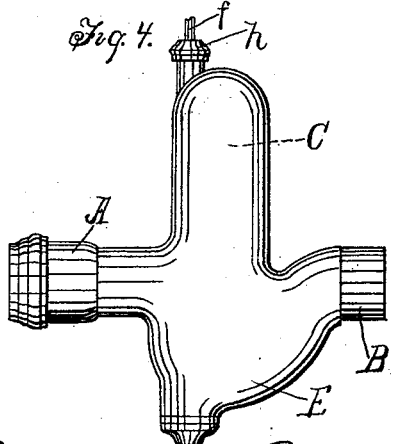
Witnesses.
P. W. Harbeson,
F. M. Townsend
Inventor.
Edward L. Burgoin
by Hazard & Townsend
his att'y

UNITED STATES PATENT OFFICE.

EDWARD L. BURGOIN, OF LOS ANGELES, CALIFORNIA.

OVERFLOW, WASTE, AND TRAP FOR BASINS, BATHS, &c.

SPECIFICATION forming part of Letters Patent No. 497,465, dated May 16, 1893.

Application filed April 25, 1892. Serial No. 430,457. (No model.)

*To all whom it may concern:*

Be it known that I, EDWARD L. BURGOIN, a citizen of the United States, residing at Los Angeles, in the county of Los Angeles and State of California, have invented a new and useful Overflow, Waste, and Trap for Basins, Baths, &c., of which the following is a specification.

My invention is designed for use with "no-overflow" basins, &c.

My invention relates to a trap over-flow and waste made in one piece and arranged to hold the water within the basin, wash-tray, sink, bath-tub, &c., provided with my invention, at a height greater than the height to which the water rises in the device before it over-flows, and consisting in a double seal trap which can be supplied with sufficient water to prevent the trap from becoming exhausted by evaporation when left for a long period of time as sometimes becomes necessary when houses are closed during the summer.

The object of my invention is to reduce fouling surface and to so arrange the interior of the over-flow, waste and trap that when the water is discharged from the bowl it will flush and scour the interior portion of the device throughout, thus preventing the accumulation of filth within it.

My invention comprises a trap over-flow and waste having two water seal retaining chambers communicating with each other through a valve-controlled passage and through a siphon passage arranged above such valve controlled passage; the inlet and outlet of such trap being of such size relative to such valve controlled passage that when such passage is opened, the discharge of water through the trap may exceed the capacity of such valved passage so that a portion of the discharge will pass through the siphon passage.

My invention also comprises an over-flow, waste and trap provided with upper and a lower water seal retaining chamber and provided with a passage arranged between such chambers for the confinement of air.

It also comprises a waste and overflow provided between its inlet and outlet with a valved passage and with a chamber communicating with the inlet and outlet and arranged above the level of the inlet and provided with a partition arranged between the valved passage and outlet to extend across the chamber and upward from the inlet and ending below the top of such chamber.

It also comprises the air space basin waste having a valve provided with an operating rod passing through the air space and through a stuffing box in the top of the waste between such seals for holding the water in the basin above the level of the space wherein the air is confined, whereby I am enabled to provide an overflow of smaller vertical dimensions than has heretofore been possible with overflows of like capacity for retaining depth of water in the basin.

The accompanying drawings illustrate my invention.

Figure 1 is a vertical mid-section of my invention applied to a wash basin filled with water to the point of over-flow. Fig. 2 is a transverse section on the line indicated by $y$—$y$ Fig. 1, fragments of the inlet and outlet pipes being also shown and the valve F removed. Fig. 3 is designed to show a form in in which the trap is dispensed with. Fig. 4 is a view of the waste intact.

A is the inlet.
B is the outlet.
C is the siphon passage.
D is the valved passage from the inlet.
E is the trap portion arranged between such passages and the outlet.
F is the valve which controls the passage D.
G is the basin and H is the connection between the basin and the inlet A.
$e$ is the partition between the receiving and discharge chambers of the trap.

The style of trap is non-essential. The trap may be full, half or three quarter S, running trap, &c., as occasion may require.

In practice the water from the basin flows through the inlet A and rises in the siphon passage C to the top of the siphon partition $c$ therein over which it flows down into the lower trap E until the water rises above the trap partition $e$ the lower end of which is below the bottom of the outlet B. Then as the water flows into the trap the escape of air from the rear member $c'$ of the siphon passage will be prevented and further over-flow over the partition will be practically stopped until the water has risen within the bowl or basin so as to over-flow the waste of water in the trap E which resists the escape of the air from siphon C. When the water has risen to this height in the bowl it will flow over the partition and continue to flow so long as the water flows into the bowl, but the water in the bowl will be maintained at a level above that of the water in the siphon by reason of the pressure of the compressed air within the siphon. When it is desired to discharge the water from the basin the valved passage F is opened, thus causing a discharge therethrough. This discharge causes the discharge also of a portion of the compressed air from within the siphon and a flow of water through the siphon is thus induced and will continue until the water is discharged from the basin. The valved passage D is then closed and the basin is again ready for use.

In case it is desired to provide a trap for a long period of time the basin is filled to the highest level the over-flow will admit and is then in condition to supply the seal within the trap so long as the water within the basin does not evaporate.

In the drawings the valve consists of a plug F operated by a rod $f$ which passes up through the siphon and out through a stuffing box $h$.

Now, having described my invention, what I claim as new, and desire to secure by Letters Patent, is—

An overflow waste and trap having an inlet and an outlet and provided with two water seals and with a valve-controlled passage between such seals of less capacity than the inlet or outlet, and also provided with an air tight siphon passage arranged above such valve-controlled passage to communicate between the seals substantially as described.

EDWARD L. BURGOIN.

Witnesses:
JAMES R. TOWNSEND,
ALFRED I. TOWNSEND.